United States Patent
Gandhi et al.

(10) Patent No.: US 11,295,399 B2
(45) Date of Patent: Apr. 5, 2022

(54) WELL EXPLORATION, SERVICE AND PRODUCTION APPLIANCE ARCHITECTURE

(71) Applicant: Landmark Graphics Corporation, Houston, TX (US)

(72) Inventors: Deepak Ramanlal Gandhi, Sugar Land, TX (US); Chandra Yeleshwarapu, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 338 days.

(21) Appl. No.: 16/479,121

(22) PCT Filed: Feb. 22, 2017

(86) PCT No.: PCT/US2017/018854
§ 371 (c)(1),
(2) Date: Jul. 18, 2019

(87) PCT Pub. No.: WO2018/156113
PCT Pub. Date: Aug. 30, 2018

(65) Prior Publication Data
US 2019/0392532 A1    Dec. 26, 2019

(51) Int. Cl.
*E21B 44/00*    (2006.01)
*G06Q 50/02*    (2012.01)
(Continued)

(52) U.S. Cl.
CPC ......... *G06Q 50/02* (2013.01); *E21B 41/0092* (2013.01); *E21B 44/00* (2013.01);
(Continued)

(58) Field of Classification Search
CPC .... G06Q 50/02; G06Q 10/0633; G06Q 10/06; E21B 41/0092; E21B 44/00; E21B 47/12;
(Continued)

(56) References Cited

U.S. PATENT DOCUMENTS

| 6,826,483 B1* | 11/2004 | Anderson ............... G01V 1/30 702/13 |
|---|---|---|
| 2008/0104168 A1 | 5/2008 | McConnell et al. |
| 2012/0303326 A1 | 11/2012 | Waid et al. |
| 2015/0019188 A1 | 1/2015 | AlShaikh et al. |
| 2015/0220861 A1 | 8/2015 | Sanchez et al. |

FOREIGN PATENT DOCUMENTS

| CN | 101371164 A * | 2/2009 | ............ G06Q 10/06 |
|---|---|---|---|
| FR | 2926591 A1 * | 7/2009 | ............ G01V 11/00 |

(Continued)

OTHER PUBLICATIONS

International Search Report and Written Opinion issued in related PCT Application No. PCT/US2017/018854 dated Nov. 17, 2017, 17 pages.

(Continued)

*Primary Examiner* — Kandasamy Thangavelu
(74) *Attorney, Agent, or Firm* — Tenley Krueger; Baker Botts L.L.P.

(57) ABSTRACT

A well exploration, services and production architecture for access to one or more well exploration, services or production (ESP) applications may be configured such that standardization of the one or more components provides for operability across multiple platforms. A deployment blueprint may specify parameters that must be met by a well ESP appliance deployed to provide access to one or more well ESP applications. Deployment rules may be based on the deployment blueprint that provides for order of deployment of components and constraints associated with packaging the components, including one or more well ESP applications, in a container. A user interface accesses the well ESP applications of the well ESP appliance based on an authorization or verification of the user. To maintain access to all data by all users, data storage for all processes of any components, including the well ESP applications, is hosted at a remote file storage system.

20 Claims, 6 Drawing Sheets

(51) Int. Cl.
- *E21B 41/00* (2006.01)
- *E21B 47/12* (2012.01)
- *G06F 9/455* (2018.01)
- *G06Q 10/06* (2012.01)
- *H04L 67/12* (2022.01)

(52) U.S. Cl.
CPC .............. *E21B 47/12* (2013.01); *G06F 9/455* (2013.01); *G06Q 10/0633* (2013.01); *H04L 67/12* (2013.01)

(58) Field of Classification Search
CPC .......... E21B 41/00; G06F 9/455; G06F 17/11; G06F 16/2228; H04L 67/12; G01V 11/00; G01V 1/30; G01V 99/005; G01V 1/306
See application file for complete search history.

(56) References Cited

FOREIGN PATENT DOCUMENTS

| FR | 2999745 A1 * | 6/2014 | ......... G06F 16/2228 |
| FR | 3027944 A1 * | 5/2016 | ............ G01V 99/005 |
| FR | 3036210 A1 * | 11/2016 | .............. G06F 17/11 |
| WO | 2011/035151 A2 | 3/2011 | |
| WO | WO 2011109839 A2 * | 9/2011 | ............. G01V 1/306 |

OTHER PUBLICATIONS

International Preliminary Report on Patentability issued related PCT No. PCT/US2017/018854 dated Sep. 6, 2019, 13 pages.
Examination Report issued in United Kingdom Patent Application No. GB1910065.0, dated Jun. 11, 2021, 2 pages.

* cited by examiner

WELL EXPLORATION, SERVICE AND PRODUCTION APPLIANCE ARCHITECTURE

CROSS-REFERENCE TO RELATED APPLICATION

The present application is a U.S. National Stage Application of International Application No. PCT/US2017/018854 filed Feb. 22, 2017, which is incorporated herein by reference in its entirety for all purposes.

TECHNICAL FIELD

The present invention relates to optimization of upstream hydrocarbon applications, and more particularly to well exploration, service and production appliance architecture for optimization of upstream hydrocarbon applications.

BACKGROUND

With the advent of mass data storage technology, databases at the wellsite can store the data associated with any one or more well exploration, services or production operations at the wellsite of a specific reservoir. The resulting data may form a large and complex data set, the interpretation and analysis of which may improve the operation of the reservoir. Traditionally, this data may either be transmitted or communicated off-site for storage and later evaluation into a model. The data may include macro-scale information, such as the location of the wellsite and micro-scale information, such as information obtained regarding the reservoir operation. This may include the torque applied to drill string, the weight on bit and the rate of penetration during a drilling job, the cement slurry rate and the density of cement during a cementing job, and the flow rate into each perforation during a fracturing job.

Because the large data set of the reservoir may be relevant to the identification and improvement of any modelling process for a well exploration, services or production operation, it may be desirable to identify a more optimized manner of processing the large complex data sets from the reservoir operation to optimize any aspect of a well exploration, services and production operation at the reservoir.

Because of the various complexities and processes involved with well exploration, services and production operations, many factors may be used to determine an optimized operation. As the process progresses, for example, in a fracturing operation, the current formation may require a different tool, software, workflow or other factors based on the identification of the parameters of the existing formation. However, though the massive amount of data regarding the reservoir operation may be available, it may require stopping operation and manual evaluation of the parameters or factors associated with the data to determine how to modify the control strategy for the reservoir operation to optimize the process for the reservoir operation.

Optimization of the upstream processes for a well exploration, services, or production operations, or any combination thereof, for a specific reservoir is needed to provide efficient and effective use of equipment, personnel, data and resources at a well site.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For any one or more well exploration, service, production operations or any combination thereof at an identified reservoir, data may be obtained for any life cycle phase of the one or more well exploration, service, or production (ESP) operations, or any combination thereof (ESP operations). For example, economic evaluations, exploration, drilling, productions, reservoir management, plug and abandonment operations may generate or require significant amounts of data. Each life cycle phase may also include one or more sub-phases, processes or operating steps. Each life cycle phase or sub-phase may require implementation of an associated hydrocarbon or well exploration, service, or production applications, or any combination thereof (well ESP applications). Defining an architecture and one or more supported applications provides optimization of the deployment and use of such well ESP applications.

Further, well ESP operations may require that data from multiple sources be analyzed, one or more software programs be utilized and multiple communications protocols or interfaces be implemented. Any of these may require access to or implementation of software programs from third party vendors or proprietary software programs. Creating the architecture to analyze, process and optimize the required data for a given well ESP operation may be extremely complex as different information handling system architectures, various software programs and applications, various programming paradigms and various portals and interfaces may be required. Providing a structure and technique for an end-to-end architecture for life cycle management on a single standardized platform that provides the analysis and processing of data to optimize a well ESP operation may reduce overall costs of the operation and provide accurate forecasts and workflows in an easy to use and adaptable environment.

According to one or more aspects of the present disclosure, an engineered appliance or software program that includes a suite of applications and interfaces may offer an optimization tool to analyze and process data according to best practices for exploration, reservoir management, well construction, hydrocarbon production, information management, any other well exploration, services or production operation or any combination thereof. By providing pre-installed and pre-certified or pre-validated applications that are configured for enhanced performance and reliability and implemented on a standardized platform or system may reduce costs including, but not limited to, costs for maintenance, updates, personnel training, licensing, and hardware.

To facilitate a better understanding of the present invention, the following examples of certain embodiments are given. In no way should the following examples be read to limit, or define, the scope of the invention. Embodiments of the present disclosure may be applicable to any type of well exploration, services or production operation for any type of well site or reservoir environment including subsurface and subsea environments.

According to one or more aspects of the present disclosure, an information handling system or computer equipment may be required.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media of an information handling system may comprise any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

Figure 1:
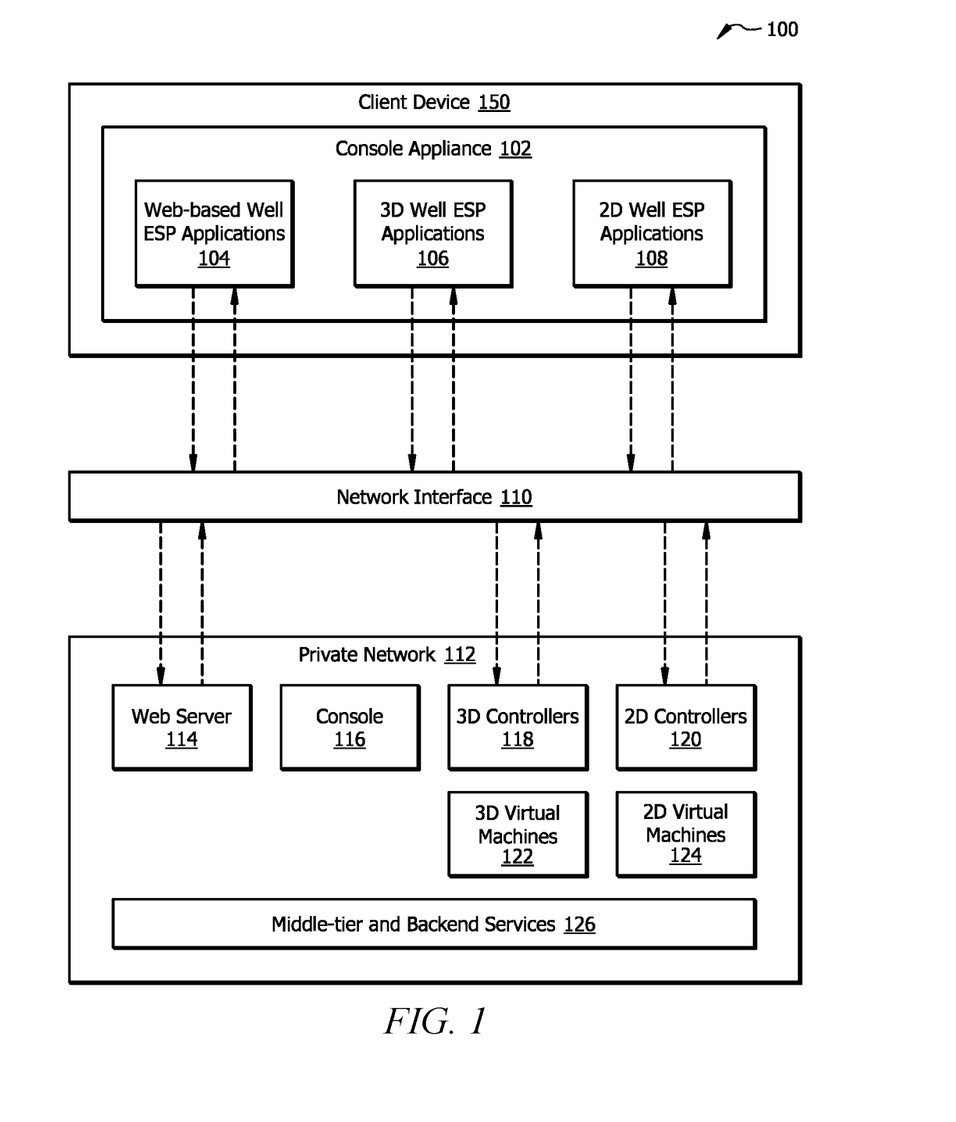
FIG. 1 is a block diagram of an example architecture of a user interface architecture for accessing to a well exploration, service and exploration appliance, according to one or more aspects of the present disclosure.

FIG. 1 is a block diagram of an example architecture of a user interface architecture 100 for accessing a well ESP appliance, according to one or more aspects of the present disclosure. User interface architecture 100 may be stored in a non-transitory storage medium of an information handling system and may comprise one or more instructions that when executed cause a processor of the information handling system to perform one or more operations or steps according to one or more aspects of the present disclosure. User interface architecture 100 may comprise a client device 150 having a user console appliance 102, a network interface 110 and a private network 112. User console appliance 102 may be a graphical user interface, for example, the graphical user interface 600 within a window or border 602 as illustrated in FIG. 6. Client device 150 may comprise one or more information handling systems, for example, information handling system 500 of FIG. 5. In one or more embodiments, the user console appliance 102 provides access to a well ESP appliance that comprises one or more software programs, applications or appliances, for example, as discussed with respect to FIG. 2. For example, user console appliance 102 may comprise one or more tabs (for example, tabs 604 in FIG. 6). At least one of the tabs (for example, tab 614 of FIG. 6) may allow a user to launch an application. In one or more embodiments, the user console appliance 102 may be a web-based application launched via web browser of client device 150. In one or more embodiments, any one or more well ESP applications accessible via the user console appliance 102 may be launched based on a load-balancing schema.

In one or more embodiments, a user may be authenticated prior to accessing any software programs, applications or appliances to determine the authorized software programs, applications and appliances for the user. For example, in one or more embodiments, a user may be required to enter credentials, a password, login information or any other identification or authorization information. A user based, at least in part, on the authorization may be associated with an access level that restricts or allows access to one or more software programs, applications, appliances or devices. In one or more embodiments, a device or information handling system may be associated with an access level that restricts or allows access to one or more software programs, applications, appliances or devices. For example, an information handling system may comprise or be assigned a unique identifier and based, at least in part, on the unique identifier a user of the information handling system may only access software programs, applications, appliances or devices associated with the access level of the information handling system. In one or more embodiments, an error message may be displayed if the user is not successfully authorized or authenticated.

User console appliance 102 may comprise one or more web-based well ESP applications 104, one or more three-dimensional (3D) well ESP applications 106, one or more two-dimensional (2D) well ESP applications 108, any other suitable well ESP software programs, applications or appliances, or any combination thereof. The one or more web-based applications 104 may comprise any one or more types of applications including, but not limited to, borehole data management (BHDM), applications included with the DecisionSpace® Suite by Halliburton/Landmark Software and Services, for example, DecisionSpace Production Monitoring (DSPM), DecisionSpace® Well Integrity Management (DSWIM), DecisionSpace® Data Quality (DSDQ), DecisionSpace® Analytics (DSA), various weblaunch applications and any other web applications for accessing, processing or analyzing stored, collected or real-time data. The one or more 3D well ESP applications 106 may comprise any one or more 3D well ESP applications as provided by the DecisionSpace® Suite or any other 3D well ESP application for accessing, processing or analyzing stored, collected or real-time data. The one or more 2D well ESP applications 108 may comprise any one or more 2D applications as provided by the DecisionSpace® Suite or any other 2D well ESP application for accessing, processing or analyzing stored, collected or real-time data. Any of the well ESP applications may be graphically organized within a folder, graphically displayed as an icon or both, for example, as indicated by application viewing pane 616 in FIG. 6.

In one or more embodiments, any one or more web applications 104, 3D well ESP applications 106 or 2D well ESP applications 108 may transmit, receive or both communications including data and information to a private network 112 via a network interface 110. In one or more embodiments, the 3D well ESP applications 106 and the 2D well ESP applications 108 are network or cloud-based applications. The network interface 110 may be any combination of wired and wireless communication pathways. Network interface 110 may be an intranet and may comprise a firewall. In one example, at least a portion of a communication is transferred across the internet using transmission control protocol/internet protocol (TCP/IP). In one or more embodiments, the network communication may be based on one or more communication protocols (for example, Hyper-Text Transfer Protocol (HTTP), HTTP Secured (HTTPS), Application Data Interface (ADI), Well Information Transfer Standard Markup Language (WITSML), or any other suitable protocol). The data or information may be stored or maintained on a non-transitory computer readable medium and the data or information may include disparate data sources (such as ADI, Java Application Data Interface (JADI), Well Information Transfer Standard Markup Language (WITSML), Log ASCII Standard (LAS), Log Information Standard (LIS), Digital Log Interchange Standard (DLIS), Well Information Transfer Standard (WITS), American Standard Code for Information Interchange (ASCII), OpenWorks, Petrel, Engineers Data Model (EDM), Real Time Data (RTD), Profibus, Modbus, OLE Process Control (OPC), various RF wireless communication protocols (such as Code Division Multiple Access (CDMA), Global System for Mobile Communications (GSM), etc.), Video/Audio, chat, or any other type of data or information). While the user interface architecture 100 illustrated in FIG. 1 employs a client-server architecture, embodiments are not limited to such an architecture, and could equally well find application in a distributed, or peer-to-peer, architecture system.

Private network 112 may comprise one or more web servers 114, one or more consoles 116, one or more 3D controllers 118, one or more 2D controllers 120, one or more 3D virtual machines 122, one or more 2D virtual machines 124 and one or more middle-tier and backend services 126. In one or more embodiments, web server 114 comprises any one or more different web servers for hosting and supporting one or more web applications 104 from any one or more sources. Console 116 may comprise one or more user interface support and maintenance consoles to provide user and administration portals or interfaces to configuration and authorization information and data, monitoring of system utilization and metrics (for example, performance, processor usage, network traffic, memory usage and any other metric), installation of updates and patches or any combination thereof.

Private network 112 may also provide one or more 3D controllers 118 and one or more 2D controllers 120 that comprise and provide the support for the one or more 3D well ESP applications 106 and 2D well ESP applications 108, respectively. One or more 3D virtual machines 122 may be associated with any one or more of the 3D controllers 118. One or more 2D virtual machines 124 may be associated with any one or more of the 2D controllers 120. In one or more embodiments, the 3D well ESP applications 106 are installed at one or more 3D virtual machines 122 and the one or more 3D controllers 118 direct output from the 3D well ESP applications 106 running on the one or more 3D virtual machines 122 to network interface 110. In one or more embodiments, the 2D well ESP applications 108 are installed at one or more 2D virtual machines 124 and the one or more 2D controllers 120 direct output from the 2D well ESP applications 108 running on the one or more 2D virtual machines 124 to the network interface 110.

Middle-tier and backend services 126 may provide data stores and any other backend services required to support the user console appliance 102. For example, middle-tier and backend services 126 may provide access to one or more databases or storage systems for any one or more of the web applications 104, the one or more 3D well ESP applications 106, the one or more 2D well ESP applications 108 or any combination thereof. Middle-tier and backend services 126 may also provide access to electronic mail applications and communications, anti-virus software programs, operating system updates and patches.

In one or more embodiments, the user console appliance 102 allows a user to access authorized products and workflows of a well ESP appliance. In one or more embodiments, the user console appliance 102 may also allow or permit a user to access any one or more authorized third-party applications of the well ESP appliance. The user console appliance 102 may be launched via a web browser on a client device 150. From the user console appliance 102, a user may select one or more applications, for example, one or more 3D well ESP applications 106, one or more 2D well ESP applications 108 or any combination thereof, or any one or more workflows for which the user is authorized to access.

In one or more embodiments, the user console appliance 102 may provide access to one or more videos, files and data. For example, users across multiple client devices 150 may share video with each other via an application or workflow that each user is authorized to access. In one or more embodiments, frequently used applications and workflows may be displayed, for example, via an icon or one or more links as graphically illustrated by workflow viewing pane 618 and favorites viewing pane 620 of FIG. 6. In one or more embodiments, frequently used applications or workflows may be added or deleted from the respective viewing pane. The user console appliance 102 may comprise a filter or search functionality, for example, as indicated by search portal 608 in FIG. 6, to aid a user in finding and launching an application. In one or more embodiments, the user console appliance 102 may provide a request form or portal, for example, via tab 610 of FIG. 6, for the user to submit a request for access to a workflow or application that the user is not currently authorized to access. A dashboard, for example, accessible via tab 612 and illustrated at dashboard viewer 606 of FIG. 6, may also be provided with the user console appliance 102 to provide the user with a visual representation of any one or more metrics associated with the user console appliance 102 or any other software program, application, appliance or device associated with the user or specified in a preferences or configuration file associated with the user. In one or more embodiments, the dashboard may provide an indicator as to the number, an identifier (unique or otherwise), or any other characteristic of available 3D virtual machines, 2D virtual machines, or both, the availability of any well ESP applications, current active users, volume or horizons of seismic data created, licensing statistics, any other well exploration, service or production, or any combination thereof. In one or more embodiments, the user console appliance 102 provides an interface to the user for the user to view, alter, edit, or change one or more preferences or configurations associated with the user.

Figure 2:
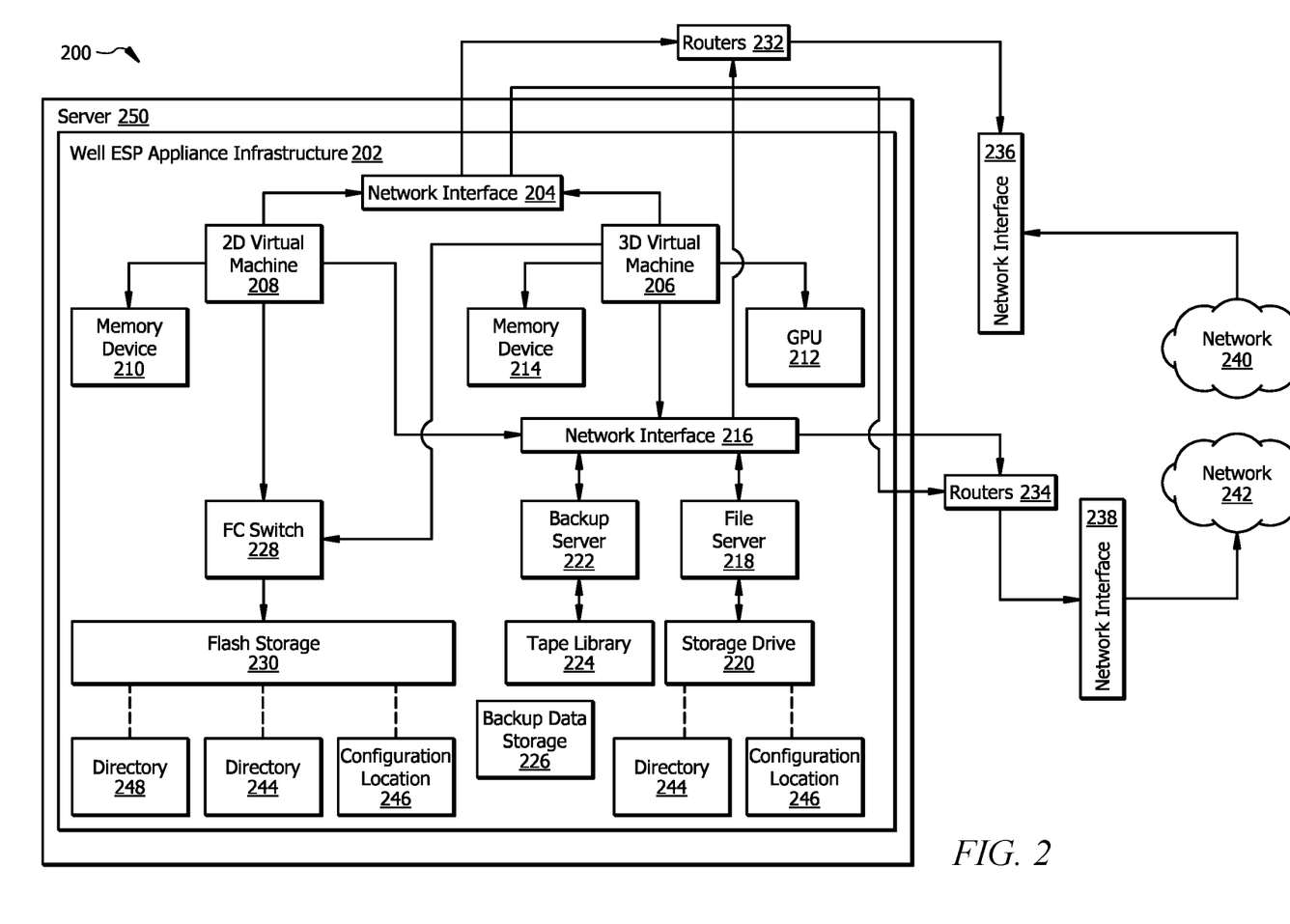
FIG. 2 is a block diagram of an example well exploration, services or production appliance architecture or any combination thereof for optimization of well exploration, service or production applications or any combination thereof, according to one or more aspects of the present disclosure.

FIG. 2 is a block diagram of an example for a well ESP appliance architecture 200 for optimization of well exploration, service or production operations applications or any combination thereof, according to one or more aspects of the present disclosure. In one or more embodiments, the user console appliance 102 of FIG. 1 provides a user interface to one or more components of the well ESP appliance architecture 200. Well ESP appliance architecture 200 may comprise a server 250 with a well ESP appliance infrastructure 202 for deploying one or more well ESP applications, for example, one or more software programs or applications for a well exploration, service or production operation, one or more routers 232 and 234, one or more network interfaces 236 and 238 and one or more networks 240 and 242. Server 250 may comprise one or more servers. Server 250 may comprise an information handling system, for example, information handling system 500 of FIG. 5. Networks 240 and 242 may comprise any number of networks that provide access or communications with a network, for example, to an intranet, an internet or cloud computing environment and may be communicatively coupled to each other, one or more other networks, or both.

In one or more embodiments, server 250 comprises a well exploration, service or production appliance infrastructure or any combination thereof (ESP appliance infrastructure) 202 for a well ESP appliance. In one or more embodiments, the well ESP appliance as illustrated by well ESP appliance infrastructure 202 may be hosted and operated by a user or by a third party. Well ESP appliance infrastructure 202 comprises one or more network interfaces 204 and 216 for interfacing one or more applications, appliances or devices of the sever 250 to one or more networks 240 and 242. Network interfaces 204 and 216 may be communicatively coupled to one or more networks 240 and 242 via one or more routers 232 and 234 and one or more other network interfaces 236 and 238, respectively. In one or more embodiments, network interfaces 204 and 216 may be the same network interface, networks 240 and 242 may be the same network, routers 232 and 234 may be the same router, network interfaces 236 and 238 may be the same network interface or any combination thereof may be implemented. In one or more embodiments, network interfaces 236 and 238 are not necessary or required.

In one or more embodiments well ESP appliance infrastructure 202 comprises one or more 2D virtual machines 208 and one or more 3D virtual machines 206 communicatively coupled to the network interface 204. The 2D virtual machine 208 and the 3D virtual machine 206 may be deployed as part of a container such that the 2D virtual machine 208 and the 3D virtual machine 206 are deployable across multiple platforms and operating systems with less overhead than typical virtual machines. In one or more embodiments, the sizing or capacity of any virtual machine may be based, at least in part, on projected or known number or quantity of users (for example, concurrent users or otherwise), disk size, amount of required memory, one or more workflows, a data volume, manner of loading data, amount of data loaded or to be loaded, or any other algorithm, criteria or factor. One or more memory devices 210 and 214 may be coupled or mounted to the 2D virtual machine 208 and the 3D virtual machine 206, respectively. In one or more embodiments, 2D virtual machine 208 and 3D virtual machine 206 share the same memory. In one or more embodiments, 3D virtual machine 206 may be coupled to a graphics processing unit (GPU) 212. In one or more embodiments, 3D virtual machine 206 may comprise the GPU 212. For example, a container may comprise a 3D virtual machine and a GPU. Each of the 2D virtual machine 208 and the 3D virtual machine 206 may communicatively couple to one or more of a network interface 216 and a network interface 204. In one or more embodiments, network interface 216 may couple to a storage medium via an Ethernet connection and network interface 204 may couple to a solid-state storage medium via a fibre channel connection. In one or more embodiments, a 2D well ESP application (for example 2D well ESP application 108 of FIG. 1), a 3D well ESP application (for example, 3D well ESP application 106 of FIG. 1) or both may interface with or be communicatively coupled to the 2D virtual machine 208, the 3D virtual machine 206 or both via network interface 204.

In one or more embodiments, any one or more of the 2D virtual machine 208 and the 3D virtual machine 206 may be communicatively coupled to a fibre channel (FC) switch 228 such that the 2D virtual machine 208 and the 3D virtual machine 206 may communicate with a flash storage 230, for example, a universal serial bus (USB) device or solid state disk (SSD). In one or more embodiments, flash storage 230 may comprise any type of suitable storage repository. Flash storage 230 may provide access to a directory or storage location 244 associated with a particular user. For example, a first directory 248 may comprise a home directory on a first network storage drive or region of flash storage 230 for storage of data associated with a first user while a second directory 248 may comprise a home directory on a second network drive or region of flash storage 230 for storage of data associated with a second user. In one or more embodiments, directory 248 may be optional and data associated with a user may be stored at any suitable storage location of flash storage 230. Flash storage 230 may comprise or have a link to an application binary and configuration location 246 for each container of the EPS appliance infrastructure 202, for example, for 2D virtual machine 208 and 3D virtual machine 206. Application binary and configuration location 246 comprises the binary or executable and any configuration data associated with a container or application. Flash storage 230 may also comprise or have a link to a container image 248. Container image 248 may comprise an image of the operating system including required binaries and libraries associated with a container, for example 2D virtual machine 208 and 3D virtual machine 206.

In one or more embodiments, the network interface 216 may be communicatively coupled to a file server 218. File server 218 may comprise one or more information handling systems, for example, information handling system 500 of FIG. 5. File server 218 may comprise a storage area network (SAN) server or a network-attached storage (NAS) server that may expert file systems (for example, common internet file system (CIFS), network file system (NFS) or server message block (SMB)) or raw volumes to one or more client devices, for example, client device 150 of FIG. 1 using one or more network protocols (for example, NFS protocol, SMB/CIFS protocol, file transfer protocol (FTP) or hypertext transfer protocol (HTTP)). File server 218 provides access to one or more storage drives or locations 220. The one or more storage drives or locations 220 may provide access to a directory or storage location 244 and application binary and configuration location 246 associated with a container, a user or both.

In one or more embodiments, well ESP appliance infrastructure 202 may comprise backup data storage 226. In one or more embodiments, backup data storage 226 comprises one or more backup images of one or more virtual machines (for example, 2D virtual machine 208 and 3D virtual machine 206) and data from any one or more storage drives, mediums, memory or other container for storing data. For example, these one or more backup images may be used for disaster recover to restore one or more virtual machines and associated data.

In one or more embodiments, a backup server 222 may be communicatively coupled to a tape library 224. Backup server 222 may receive data and information associated with any one or more containers, for example, 2D virtual machine 208 and 3D virtual machine 206.

In one or more embodiments, an administrator console may be provided as part of the user console appliance 102 of FIG. 1 or well ESP appliance architecture 202 of FIG. 2. The administrator console may provide an authorized use the ability to configure any of the one or more well ESP applications discussed above, manage users or group of users and associated privileges, monitor any operation of the user interface console 102, network performance, hardware, any of the well ESP applications discussed above, backups, updates, licensing, or any other metric or parameters associated with the user console appliance 102 or the well ESP appliance architecture 202.

In one or embodiments, any data communicated or received via any one or more of networks 240 and 242 may be encrypted. In one or more embodiments, any data stored by any one or more components of the well ESP appliance architecture may be encrypted.

Figure 3:
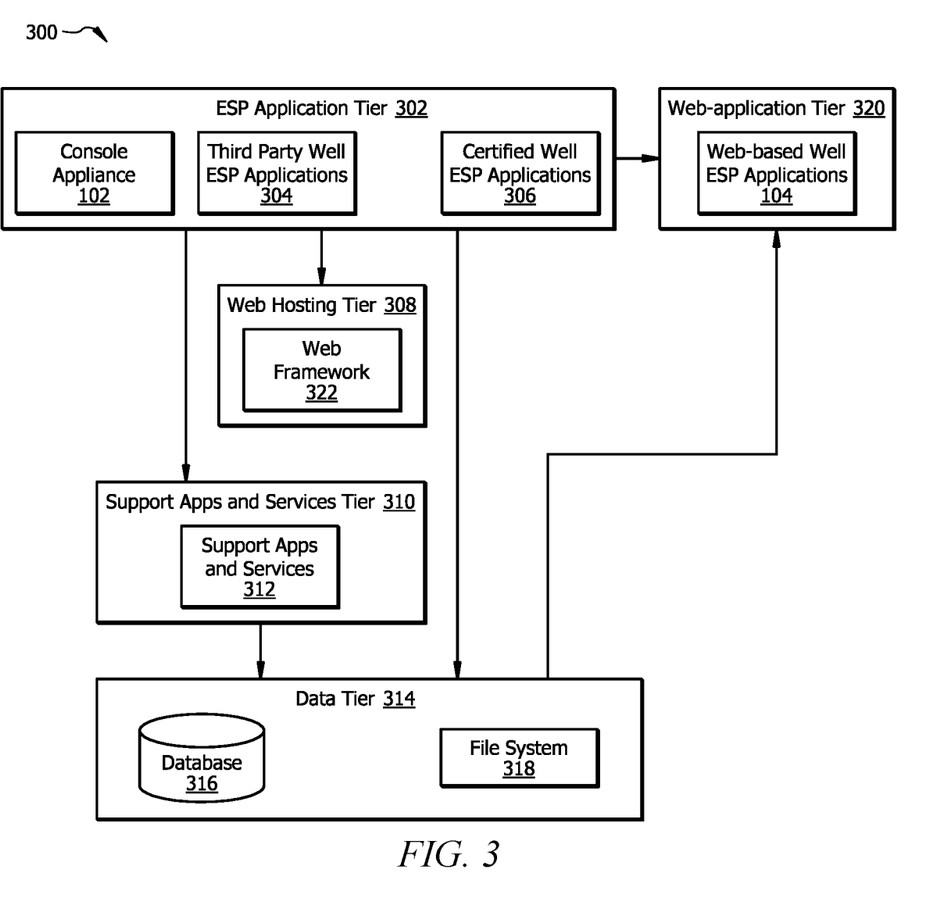
FIG. 3 is a block diagram of well exploration, services or production application deployment architecture or any combination thereof, according to one or more aspects of the present disclosure.

FIG. 3 is a block diagram of well exploration, services and production application deployment architecture or any combination thereof (ESP application deployment architecture) 300, according to one or more aspects of the present disclosure. In one or more embodiments, well ESP application deployment architecture 300 comprises a well exploration, service or production application tier or any combination thereof (ESP application tier) 302, a web hosting tier 308, a support applications and services tier 310, a data tier 314 and a web application tier 320. In one or more embodiments, each of the application tier 302, a web hosting tier 308, a support applications and services tier 310, a data tier 314 and a web application tier 320 comprises one or more containers.

In one or more embodiments, a well ESP application tier 302 comprises a user console appliance 102, one or more third-party well ESP applications 304 and one or more certified well ESP applications 306. The certified well ESP applications 306 may comprise one or more web browsers, one or more java clients, one or more 2D well ESP applications (for example, one or more 2D well ESP applications 108 of FIG. 1), one or more 3D well ESP applications (for example, one or more 3D well ESP applications 106 of FIG. 1), an email application, a licensing application, active directory (AD) service, Linux® directory active protocol (LDAP) service, monitoring service, and one or more industry standard applications. Each certified or supported well ESP application 306 may be encapsulated in a container. One or more software programs, applications, services or containers of well ESP application tier 302 may communicate or exchange data and information with the web tier 308, the support applications and services tier 310, the data tier 314, the web application tier 320, or any combination thereof.

The web tier 308 hosts one or more web browsers or web framework 322. The web application tier 320 hosts one or more web applications, for example, web applications 104 of FIG. 1. The support applications and services tier 310 may comprise one or more support applications and services 312. The support applications and services 312 may comprise one or more software programs, applications, containers or services including, but not limited to, one or more search engines, one or more data servers, one or more messaging services, one or more analytics, one or more hubs, one or more industry standard support applications and services, one or more web services, one or more anti-virus programs or any combination thereof. The data tier 314 may comprise one or more databases 316 for data storage for any one or more components or containers of EPS application deployment architecture 300. In one or more embodiments, one or more databases 316 may be prepopulated with one or more data sets. The data tier 314 may comprise one or more file systems 318.

Figure 4:
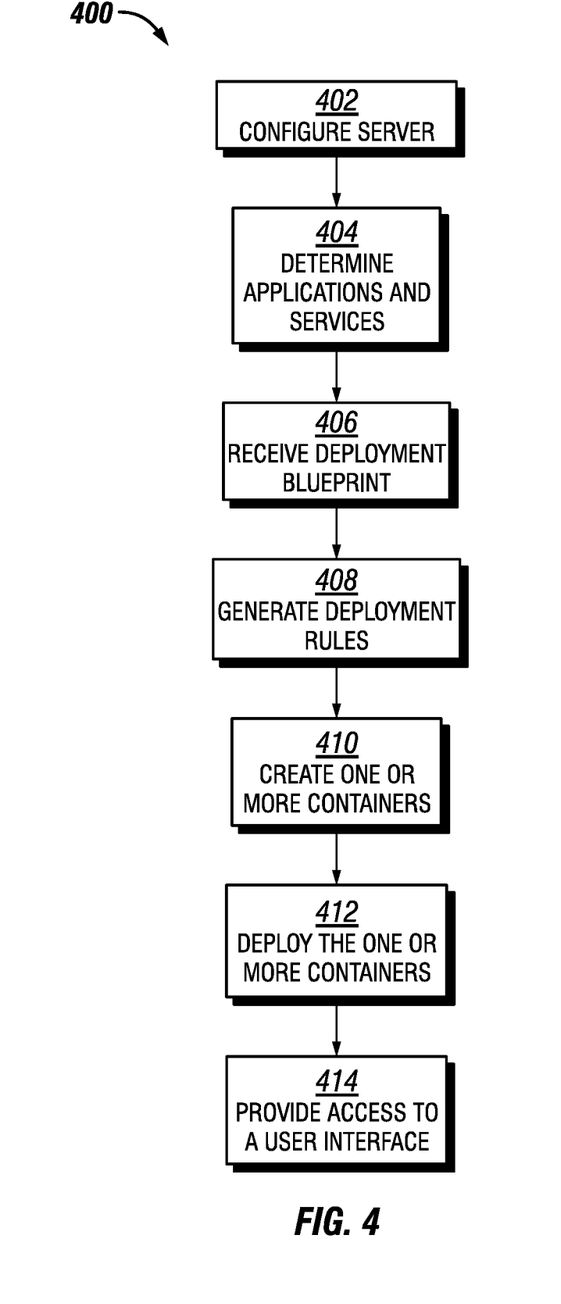
FIG. 4 is a flowchart illustrating a method for deploying a well exploration, services or production appliance or any combination thereof, according to one or more aspects of the present disclosure.

FIG. 4 is a flowchart illustrating a method for deploying a well exploration, services or production appliance or any combination thereof (ESP appliance 400), according to one or more aspects of the present invention. At step 402 a server or computing device, for example server 250 of FIG. 2, is configured. For example, the necessary hardware may be determined, installed and configured, one or more operating systems may be determined and may be installed and configured, any one or more network connections may be initiated and verified, a hypervisor may be installed and configured, one or more proper credentials or privileges, login information or other verification information may be stored in a memory and any other necessary configurations to prepare the server 250 for deployment of a well ESP appliance, for example, as illustrated in FIG. 2. Any one or more of the foregoing may be based, at least in part, on one or more inputs from a user via a user interface, for example, a user interface 600 as illustrated in FIG. 6. In one or more embodiments, server 250 may be configured via execution of a script. In one or more embodiments, the server or computing device to be configured may be selected via a user interface, for example, a user interface 600 as illustrated in FIG. 6. In one or more embodiments, this user interface may be a distinct user interface from the user interface console 102 of FIG. 1 and may be run as a distinct appliance before any virtual machines are created. In one or more embodiments, this user interface may be installed as part of the first virtual machine created or may be installed manually on the well ESP appliance. For example, the user interface may create one or more virtual machines for the well ESP appliance and monitor installation and configuration of one or more applications.

At step 404, the one or more well ESP applications and services, third party well ESP applications or both may be determined or selected. The one or more well ESP applications are certified or supported applications that are configured to execute and operate within the parameters identified for a given client device, for example, for a given network connection, memory configuration, workflow, or any other parameter. The well ESP applications and services may be selected from a list of certified or supported well ESP applications and services as identified with respect to the discussion of FIG. 3, for example, as identified with respect to the well ESP application tier 302, web hosting tier 308, support applications and services tier 310, data tier 314, web application tier 320, or any combination thereof. In one or more embodiments, an well ESP template or default setup may comprise one or more well ESP applications and services. For example, a well ESP template may be defined for a given well ESP operation that includes one or more well ESP applications and services commonly or routinely required for the given well ESP operation. In one or more embodiments, a well ESP application or service may added to or removed from a selected well ESP template for inclusion in the deployment of the user interface. The selected or determined one or more well ESP applications and services, third party applications or both are based, at least in part, on a well ESP operation, a well ESP operation life phase or life cycle, amount of data associated with a given well ESP operation, one or more data source for the data associated with a given well ESP operation, any other parameters associated with a given well ESP operation, or any combination thereof. In one or more embodiments, one or more restrictions are also determined. The one or more restrictions may comprise any one or more of naming convention for one or more virtual machines, one or more Internet Protocol (IP) addresses available, one or more information technology (IT) overrides, any other user restrictions, and any other restrictions required for installation and configuration for the one or more well ESP applications and services, third party well ESP applications or both.

At step 406, the deployment blueprint is selected and processed. The deployment blueprint may be selected from one or more approved deployment blueprints that comply with one or more best practices or have been verified for operability and supportability across one or more designated platforms. For example, a deployment blueprint may be associated with one or more specific well ESP operations. The deployment blueprint identifies a standardized infrastructure of one or more components, for example, type and version of an operating system, one or more databases, one or more browsers, or any other supported well ESP applications or third party applications. This standardization prevents a component from being deployed that is not uniformly operable across the selected or determined platforms. The deployment blueprint may also identify best network practices, for example, no local storage, no local accounts, hosting configurations or other network options. The deployment blueprint also identifies governance for development operations, products and workflows associated with a given well ESP operation. The deployment blueprint may also identify configuration and installation guidelines for any one or more well ESP applications and services or third party software. For example, the deployment blueprint may specify that no applications are installed on an end-user's device, for example, client device 150 in FIG. 1. For example, the deployment blueprint may identify that the selected well ESP applications and services may only be accessible via a remote application hosted at a network location or in the cloud, for example, a web browser or other portal, a Citrix client or a Hewlett-Packard Remote Graphics Software (HP RGS) client. In one or more embodiments, the deployment blueprint may identify or specify that all web applications be accessed via a web browser, all 3D applications are accessed via HP RGS, all non-3D applications are accessed via a Citrix client (for example, hosted on a Citrix XenApp® server), all backend and middle-tier services run on a Linux® operating system (though an exception may apply to Windows-only services), only certain versions of operating systems may be installed (for example, Windows 7, Windows Server 2008 R2 and Red Hat Enterprise Linux (RHEL) Server 6.6), specific releases of platforms and databases, all virtual machines will store application data on a file server (for example, file server 218 of FIG. 2) and will not have access to local storage and local users or user groups will be defined in a centralized identity store (for example, AD, LDAP or network information service (NIS).

At step 408, one or more deployment rules are generated. The one or more deployment rules are based, at least in part, on the deployment blueprint. The deployment rules may identify the order of installation of the selected or determined well ESP applications and services and any third party applications. The order of installation may be based, at least in part, on any dependencies. For example, a first well ESP application may require that a second well ESP application be installed before the first well ESP application. The one or more deployment rules may identify the container capacities, number of processors of the server 250, amount of memory and disk space of the server 250 and any other server 250-specific properties or parameters.

At step 410, one or more containers are created comprising the one or more selected well ESP applications and services and any selected third party software. The one or more containers may be created by a deployment engine. The creation of the containers may be based, at least in part, on the deployment rules. In one or more embodiments, the one or more containers are deployed as virtual machines. At step 412, the one or more containers are deployed on the server 250. For example, the one or more containers are deployed according to the architecture illustrated in FIG. 2. In one or more embodiments, the one or more containers are deploying in a hypervisor infrastructure of the server 250.

At step 414, a user interface, for example, as illustrated in FIG. 1, is launched and a user is provided access according to any security or authorization requirements to the one or more well ESP applications and services and third party software deployed on the server 250.

Figure 5:
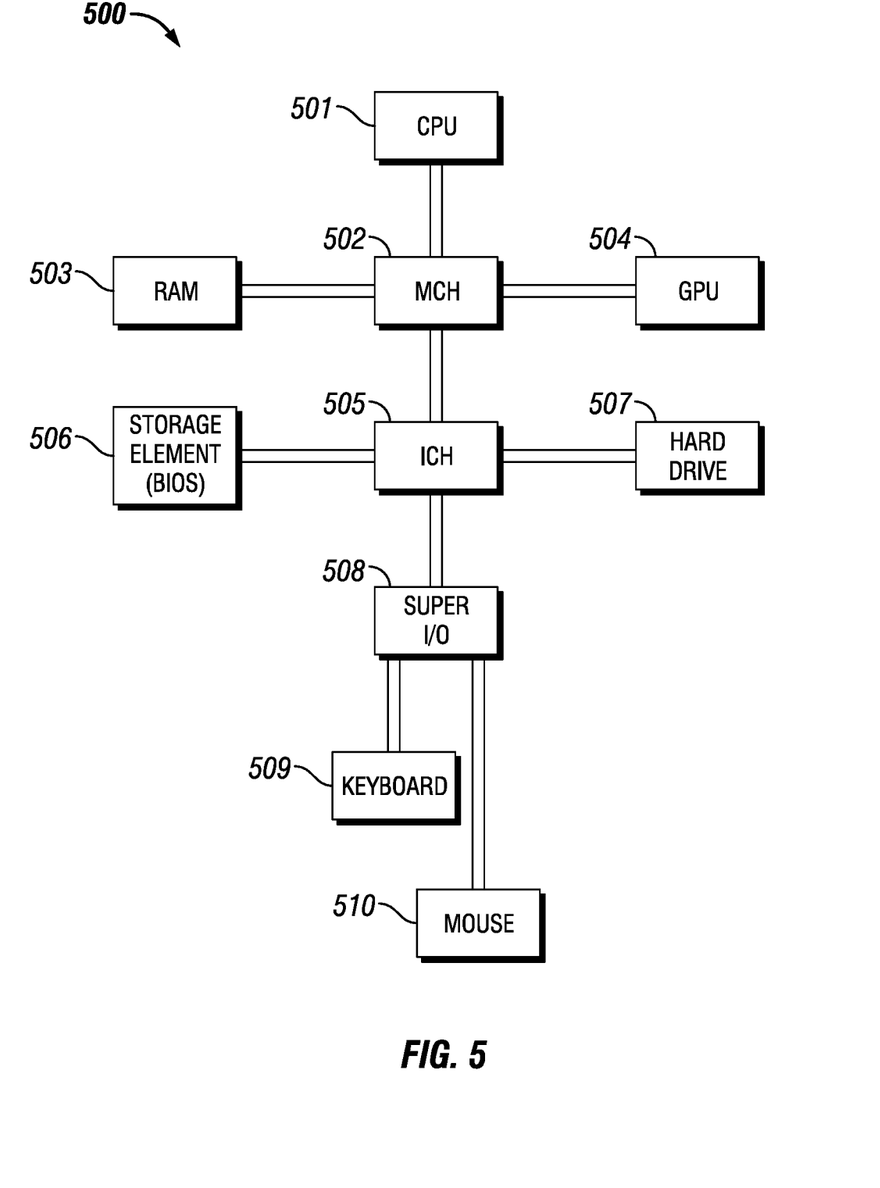
FIG. 5 is a diagram illustrating an example information handling system, according to one or more aspects of the present disclosure.
Figure 6:
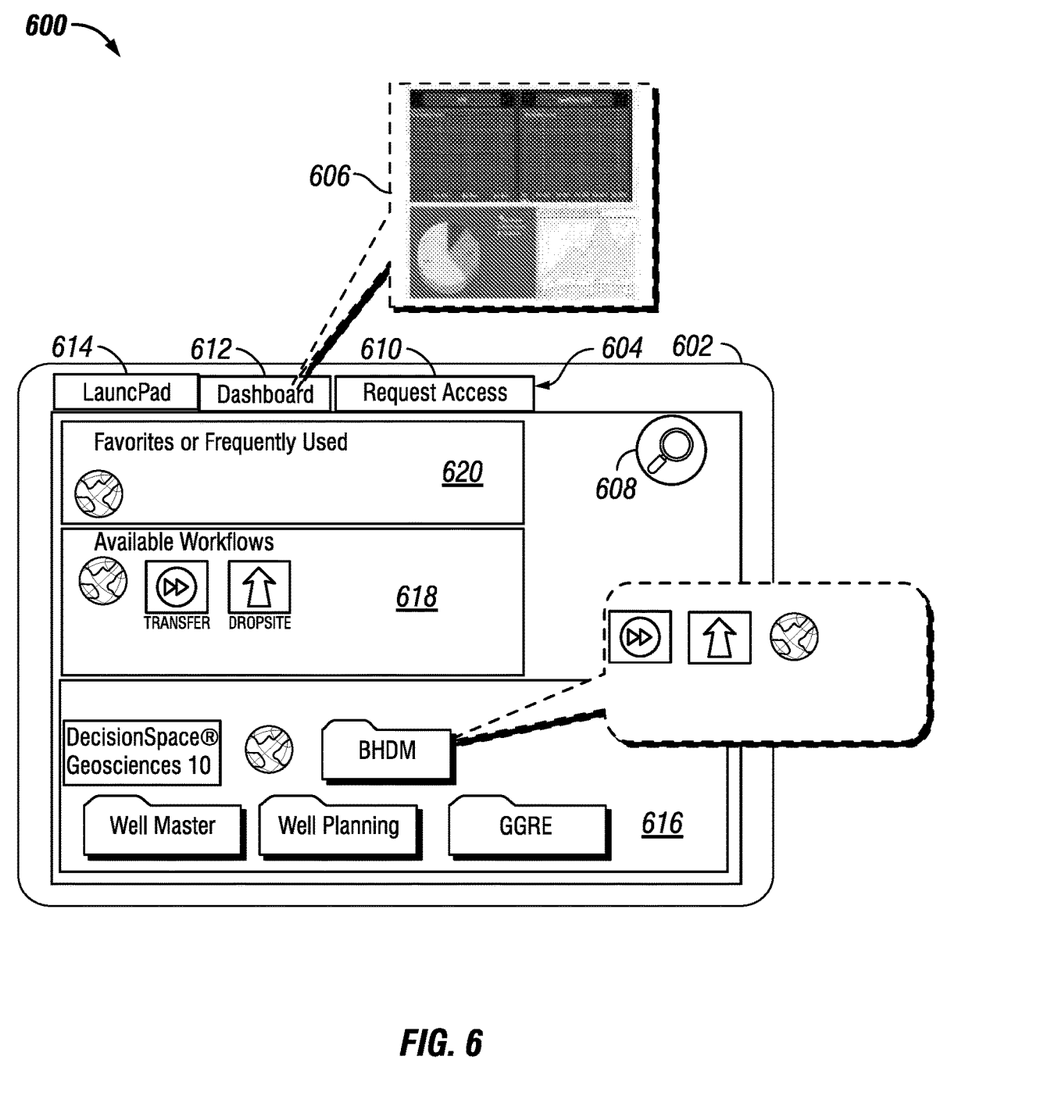
FIG. 6 is an example graphical user interface, according to one or more aspects of the present invention.

FIG. 5 is a diagram illustrating an example information handling system 500, according to one or more aspects of the present disclosure. The client device 150 in FIG. 1 and the server 250 in FIG. 2 may take a form similar to the information handling system 500 or include one or more components of information handling system 500. A processor or central processing unit (CPU) 501 of the information handling system 500 is communicatively coupled to a memory controller hub (MCH) or north bridge 502. The processor 501 may include, for example a microprocessor, microcontroller, digital signal processor (DSP), application specific integrated circuit (ASIC), or any other digital or analog circuitry configured to interpret and/or execute program instructions and/or process data. Processor 501 may be configured to interpret and/or execute program instructions or other data retrieved and stored in any memory such as memory 503 or hard drive 507. Program instructions or other data may constitute portions of a software or application for carrying out one or more methods described herein. Memory 503 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software or application may be retrieved and stored in memory 503, for example, a non-transitory memory, for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuit or components. For example, components of information handling system 500 may be implemented by configured computer program instructions.

Memory controller hub 502 may include a memory controller for directing information to or from various system memory components within the information handling system 500, such as memory 503, storage element 506, and hard drive 507. The memory controller hub 502 may be coupled to memory 503 and a graphics processing unit (GPU) 504. Memory controller hub 502 may also be coupled to an I/O controller hub (ICH) or south bridge 505. I/O controller hub 505 is coupled to storage elements of the information handling system 500, including a storage element 506, which may comprise a flash ROM that includes a basic input/output system (BIOS) of the computer system. I/O controller hub 505 is also coupled to the hard drive 507 of the information handling system 500. I/O controller hub 505 may also be coupled to a Super I/O chip 508, which is itself coupled to several of the I/O ports of the computer system, including keyboard 509 and mouse 510.

In certain embodiments, the client device 150 and the server 250 may comprise an information handling system 500 with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

In one or more embodiments, a method for deploying a well exploration, services and production appliance comprises determining an operating system from one or more supported operating systems, determining a database from one or more supported databases, determining one or more supported well exploration, services and production (ESP) applications based, at least in part, on a well ESP operation, determining a deployment blueprint, wherein the deployment blueprint identifies a standardized infrastructure of the one or more supported well ESP applications, containerizing each of the operating system, the database and the one or more supported well ESP applications in one or more containers as the well ESP appliance, generating one or more deployment rules based, at least in part, on the deployment blueprint, wherein the deployment rules define at least an architectural structure for the one or more containers and deploying the well ESP appliance on a server based, at least in part, on the one or more deployment rules. In one or more embodiments the one or more well ESP applications and the database are accessible via a remote application. In one or more embodiments, the one or more well ESP applications and the database are accessible via a remote application. In one or more embodiments, each of the one or more well ESP applications are associated with a virtual machine. In one or more embodiments, at least one of the one or more ESP applications comprises a two-dimensional well ESP application. In one or more embodiments, the method for deploying a well exploration, services and production appliance comprises authenticating by the well ESP appliance a user before allowing access to the one or more containers of the well ESP appliance. In one or more embodiments, the method for deploying a well exploration, services and production appliance comprises storing the operation data in a database.

In one or more embodiments, a non-transitory computer-readable medium storing one or more instructions that, when executed by data processing apparatus, cause the processor to determine an operating system from one or more supported operating systems, determine a database from one or more supported databases, determine one or more supported well exploration, services and production (ESP) applications based, at least in part, on a well ESP operation, determine a deployment blueprint, wherein the deployment blueprint identifies a standardized infrastructure of the one or more supported well ESP applications, contain each of the operation system the database and the one or more supported well ESP applications in one or more containers as the well ESP appliance, generate one or more deployment rules based, at least in part, on the deployment blueprint, wherein the deployment rules define at least an architectural structure for the one or more containers and deploy the well ESP appliance on a server based, at least in part, on the one or more deployment rules. In one or more embodiments, one or more well ESP applications and the database are accessible via a remote application. In one or more embodiments, each of the one or more well ESP applications are associated with a virtual machine. In one or more embodiments, at least one of the one or more ESP applications comprises a two-dimensional well ESP application. In one or more embodiments, at least one of the one or more ESP applications comprises a three-dimensional well ESP application. In one or more embodiments, the one or more instructions that, when executed by data processing apparatus, further cause the processor to authenticate by the well ESP appliance a user before allowing access to the one or more containers of the well ESP appliance. In one or more embodiments, the one or more instructions that, when executed by data processing apparatus, further cause the processor to store the operation data in a database.

In one or more embodiments, an information handling system comprises a memory, a processor coupled to the memory, wherein the memory comprises one or more instructions executable by the processor to determine an operating system from one or more supported operating systems, determine a database from one or more supported databases, determine one or more supported well exploration, services and production (ESP) applications based, at least in part, on a well ESP operation, determine a deployment blueprint, wherein the deployment blueprint identifies a standardized infrastructure of the one or more supported well ESP applications, contain each of the operation system the database and the one or more supported well ESP applications in one or more containers as the well ESP appliance, generate one or more deployment rules based, at least in part, on the deployment blueprint, wherein the deployment rules define at least an architectural structure for the one or more containers and deploy the well ESP appliance on a server based, at least in part, on the one or more deployment rules. In one or more embodiments, the one or more well ESP applications and the database are accessible via a remote application. In one or more embodiments, each of the one or more well ESP applications are associated with a virtual machine. In one or more embodiments, at least one of the one or more ESP applications comprises a two-dimensional well ESP application. In one or more embodiments, at least one of the one or more ESP applications comprises a three-dimensional well ESP application. In one or more embodiments, the one or more instructions further executable by the processor to authenticate by the well ESP appliance a user before allowing access to the one or more containers of the well ESP appliance.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

A number of examples have been described. Nevertheless, it will be understood that various modifications can be made. Accordingly, other implementations are within the scope of the following claims.

What is claimed is:

1. A method for deploying a well exploration, services and production appliance, comprising:
   determining an operating system from one or more supported operating systems;
   determining a database from one or more supported databases;
   determining one or more supported well exploration, services and production (ESP) applications based, at least in part, on a well ESP operation;
   determining a deployment blueprint, wherein the deployment blueprint identifies a standardized infrastructure of the one or more supported well ESP applications;
   containerizing each of the operating system, the database and the one or more supported well ESP applications in one or more containers as the well ESP appliance;
   generating one or more deployment rules based, at least in part, on the deployment blueprint, wherein the deployment rules define at least an architectural structure for the one or more containers; and
   deploying the well ESP appliance on a server based, at least in part, on the one or more deployment rules.

2. The method of claim 1, wherein the one or more well ESP applications and the database are accessible via a remote application.

3. The method of claim 1, wherein each of the one or more well ESP applications are associated with a virtual machine.

4. The method of claim 1, wherein at least one of the one or more ESP applications comprises a two-dimensional well ESP application.

5. The method of claim 1, wherein at least one of the one or more ESP applications comprises a three-dimensional well ESP application.

6. The method of claim 1, further comprising authenticating by the well ESP appliance a user before allowing access to the one or more containers of the well ESP appliance.

7. The method of claim 1, further comprising storing the operation data in a database.

8. A non-transitory computer-readable medium storing one or more instructions that, when executed by data processing apparatus, cause the processor to:
   determine an operating system from one or more supported operating systems;
   determine a database from one or more supported databases;
   determine one or more supported well exploration, services and production (ESP) applications based, at least in part, on a well ESP operation;
   determine a deployment blueprint, wherein the deployment blueprint identifies a standardized infrastructure of the one or more supported well ESP applications;
   containerizing each of the operating system, the database and the one or more supported well ESP applications in one or more containers as the well ESP appliance;
   generate one or more deployment rules based, at least in part, on the deployment blueprint, wherein the deployment rules define at least an architectural structure for the one or more containers; and
   deploy the well ESP appliance on a server based, at least in part, on the one or more deployment rules.

9. The computer-readable medium of claim 8, wherein the one or more well ESP applications and the database are accessible via a remote application.

10. The computer-readable medium of claim 8, wherein each of the one or more well ESP applications are associated with a virtual machine.

11. The computer-readable medium of claim 8, wherein at least one of the one or more ESP applications comprises a two-dimensional well ESP application.

12. The computer-readable medium of claim 8, wherein at least one of the one or more ESP applications comprises a three-dimensional well ESP application.

13. The computer-readable medium of claim 8, the one or more instructions that, when executed by data processing apparatus, further cause the processor to authenticate by the well ESP appliance a user before allowing access to the one or more containers of the well ESP appliance.

14. The computer-readable medium of claim 8, the one or more instructions that, when executed by data processing apparatus, further cause the processor to store the operation data in a database.

15. An information handling system comprising:
a memory;
a processor coupled to the memory, wherein the memory comprises one or more instructions executable by the processor to:
determine an operating system from one or more supported operating systems;
determine a database from one or more supported databases;
determine one or more supported well exploration, services and production (ESP) applications based, at least in part, on a well ESP operation;
determine a deployment blueprint, wherein the deployment blueprint identifies a standardized infrastructure of the one or more supported well ESP applications;
containerizing each of the operating system, the database and the one or more supported well ESP applications in one or more containers as the well ESP appliance;
generate one or more deployment rules based, at least in part, on the deployment blueprint, wherein the deployment rules define at least an architectural structure for the one or more containers; and
deploy the well ESP appliance on a server based, at least in part, on the one or more deployment rules.

16. The information handling system of claim 15, wherein the one or more well ESP applications and the database are accessible via a remote application.

17. The information handling system of claim 15, wherein each of the one or more well ESP applications are associated with a virtual machine.

18. The information handling system of claim 15, wherein at least one of the one or more ESP applications comprises a two-dimensional well ESP application.

19. The information handling system of claim 15, wherein at least one of the one or more ESP applications comprises a three-dimensional well ESP application.

20. The information handling system of claim 15, the one or more instructions further executable by the processor to authenticate by the well ESP appliance a user before allowing access to the one or more containers of the well ESP appliance.

* * * * *